Oct. 22, 1929.  E. PICQUEREZ  1,732,657
RESILIENT JOINT AND METHOD OF MAKING
Filed May 23, 1929
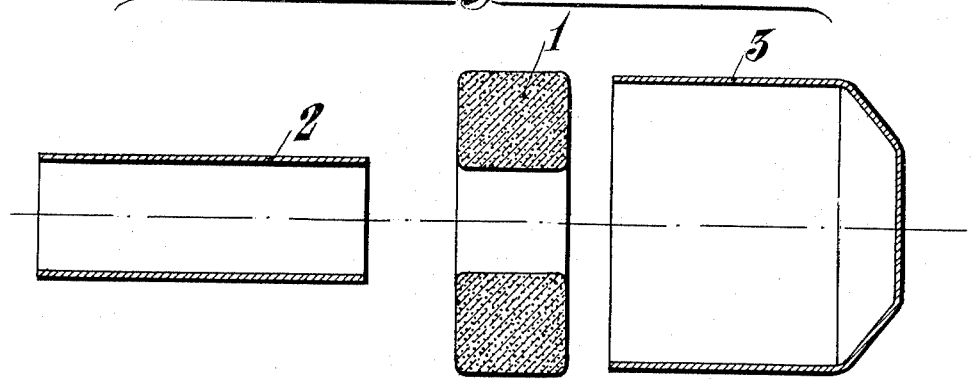
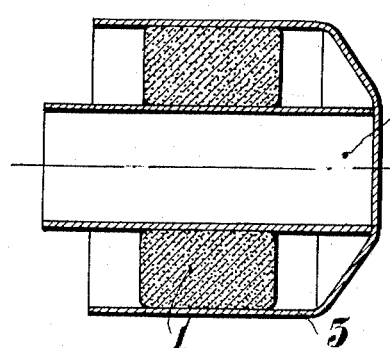
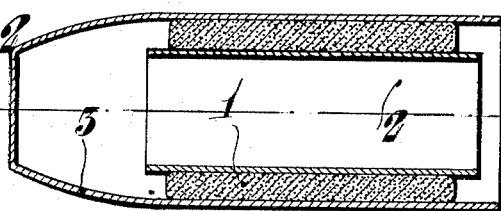
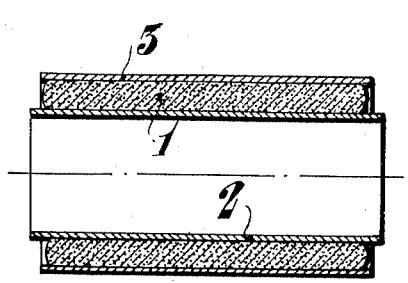
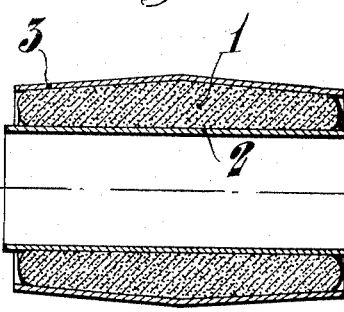
Inventor
E. Picquerez
By Marks & Clerk
Attys.

Patented Oct. 22, 1929

1,732,657

UNITED STATES PATENT OFFICE

EMILE PICQUEREZ, OF ST. CLOUD, FRANCE, ASSIGNOR TO SOCIETE ANONYME DES ETABLISSEMENTS TECALEMIT, OF PARIS, FRANCE, A JOINT-STOCK COMPANY

RESILIENT JOINT AND METHOD OF MAKING

Application filed May 23, 1929. Serial No. 365,492.

The present invention has for object improvements in removable bearings adapted to be placed between two members journalled one on the other and receiving only oscillatory movements.

It has already been proposed, for that purpose, to interpose between two such members, a resilient material arranged between two concentric sockets, one of which is rendered rigid with the axis of the journal, and the other with the member which surrounds it. But when for carrying out this assemblage, use is made of rubber compressed under a high initial tension, it is necessary for introducing the rubber between the two sockets, to employ a lubricant such, for instance, as talc, the effect of which is to greatly diminish the adherence of the contact. It results therefrom that, in use, the rubber has a tendency to slip on the sockets. If, on the contrary, use is made of rubber vulcanized on the spot, an important adherence is in fact obtained, but, the material not being under a sufficient initial tension, is crushed and becomes distorted under the action of the radial loads, this having for effect to deprive the journalling of all geometrical accuracy.

The present invention is adapted to remedy this inconvenience, and has for main object a new method of manufacture which consists in utilizing rubber, or other resilient material, but slightly compressed, easy to introduce between the two sockets and firmly compressed after its introduction by the radial tightening of the outer socket or the radial spacing apart of the inner socket.

The invention resides also in the following detail objects constituent of the main object:

(a) To improve the centering and the resistance to axial loads, by giving, by a suitable action on at least one of the sockets, to the interposed resilient material a biconical shape, the diameter of which in the middle plane is greater than the diameter of the ends, so as to avoid any displacement of the material in the direction of the axis.

(b) The outer socket which is subsequently to be radially shrunk, is preferably constituted by a pressed cup, elongated upon shrinking and subsequently cut to length.

The accompanying drawing illustrates, by way of example, a form of construction of a journal device in accordance with the present invention, in the different phases of carrying the process into practice.

Figure 1 is a sectional view of the sockets and of the rubber washer in their initial state and separated.

Figure 2 is a section of the same members assembled.

Figure 3 is a corresponding section after the pressing operation has been effected.

Figure 4 is a section after the cutting to length operation has been carried out.

Figure 5 is a section after the accessory operation which consists in giving a biconical shape to the outer socket.

The sequence of the operations in the process in accordance with the invention is as follows:

1. The expanded washer 1, made of rubber, or other resilient material, is introduced with a very slight compression, nearly negligible, between a central socket 2 and a blank 3 pressed in the shape of a cup and having an inner diameter slightly smaller than the outer diameter of the rubber washer (Fig. 2).

2. The outer blank is then given, by pressing, the exact diameter, by firmly compressing the rubber and placing a mandrel within the inner socket (Fig. 3).

3. The whole is then cut to suitable length, the central socket being slightly longer than the outer socket, and the latter being slightly longer than the rubber (Fig. 4).

4. After this operation, the bearing is ready to be cylindrically mounted. It can be terminated by giving it, by pressing, a slightly conical shape (Fig. 5), its diameter in the middle plane being greater than that of the ends, so as to avoid any tendency of the rubber to move in the longitudinal direction.

Instead of acting on the inner socket for obtaining the compression and holding in position of the rubber, it is obvious that the inner socket, or both the inner and outer sockets might be acted upon.

Another method of carrying the invention into practice consists in placing between two concentric tubes of great length, a tube made of rubber or other resilient material, the whole thus constituted being subsequently drawn out in a drawing frame or machine, and then cut according to the desired lengths, so as to obtain terminated joints similar to those illustrated in Fig. 4.

What I claim as my invention and desire to secure by Letters Patent is:—

1. A method for the manufacture of a resilient joint constituted by two cylinders having the same axis and a tube made of a firmly compressed resilient material, between these two cylinders, which method consists: in introducing the tube of resilient material between the two cylinders, and in modifying the diameter of at least one of the said cylinders for producing a high radial compression of the tube made of resilient material.

2. A method for the manufacture of a resilient joint constituted by two cylinders having the same axis and a tube made of a firmly compressed resilient material, between these two cylinders, which method consists: in introducing the tube of resilient material between the two cylinders, and in reducing the diameter of the outer cylinder for producing a high radial compression of the tube made of resilient material.

3. A method for the manufacture of a resilient joint constituted by two cylinders having the same axis and a tube made of a firmly compressed resilient material, between these two cylinders, which method consists: in introducing the tube of resilient material between the two cylinders, and in reducing, by a drawing out operation the diameter of the outer cylinder for producing a high radial compression of the tube made of resilient material.

4. A method for the manufacture of a resilient joint, which consists in forming a metal cup having cylindrical edges, in placing within this cup a tube made of resilient material, in arranging a socket within the resilient tube, in inserting within the socket a mandrel adapted to bear against the bottom of the cup, in placing the cup in a die head, in forcing the cup in the die head, and in cutting the ends of the cup after it has been drawn out.

5. A resilient joint, comprising a cylinder forming a journal, a socket of larger diameter at the central portion than at the ends, and a tube made of resilient material firmly compressed between the central cylinder and the socket.

6. A method for the manufacture of a resilient joint constituted by two cylinders having the same axis and a tube made of firmly compressed resilient material, between these two cylinders, which method consists: in introducing the tube of resilient material between the two cylinders, and in distorting at least one of the said cylinders for giving to the outer surface of the tube made of resilient material a biconical shape, the thickness being greater in the central portion than at the ends.

7. A method for the manufacture of a resilient joint, which consists in forming a metal cup having cylindrical edges, in placing within this cup a tube made of resilient material, in arranging a socket within the resilient tube, in inserting within the socket a mandrel adapted to bear against the bottom of the cup, in placing the cup in a die head, in forcing the cup in the die head, in cutting the ends of the cup after it has been drawn out, and in distorting the outer cylinder for giving to the outer surface of the tube made of resilient material a biconical shape, the thickness being greater in the central portion than at the ends.

In testimony whereof I have signed this specification.

EMILE PICQUEREZ.